(12) United States Patent
Kurashima et al.

(10) Patent No.: US 12,050,753 B2
(45) Date of Patent: *Jul. 30, 2024

(54) TOUCH PANEL, DISPLAY DEVICE, AND ELECTRONIC APPARATUS

(71) Applicant: Japan Display Inc., Tokyo (JP)

(72) Inventors: Takeshi Kurashima, Aichi-Ken (JP); Shoji Hinata, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/314,852

(22) Filed: May 10, 2023

(65) Prior Publication Data

US 2023/0273703 A1 Aug. 31, 2023

Related U.S. Application Data

(63) Continuation of application No. 17/496,922, filed on Oct. 8, 2021, now Pat. No. 11,687,204, which is a continuation of application No. 16/782,922, filed on Feb. 5, 2020, now Pat. No. 11,175,783, which is a continuation of application No. 16/004,241, filed on Jun. 8, 2018, now Pat. No. 10,592,020, which is a continuation of application No. 13/682,273, filed on Nov. 20, 2012, now Pat. No. 10,019,083.

(30) Foreign Application Priority Data

Feb. 8, 2012 (JP) .................................. 2012-024896

(51) Int. Cl.
*G06F 3/041* (2006.01)
*G06F 3/044* (2006.01)

(52) U.S. Cl.
CPC ............ *G06F 3/0446* (2019.05); *G06F 3/041* (2013.01); *G06F 3/0445* (2019.05); *G06F 2203/04103* (2013.01); *G06F 2203/04107* (2013.01); *G06F 2203/04111* (2013.01)

(58) Field of Classification Search
CPC ...... G06F 3/0446; G06F 3/0445; G06F 3/041; G06F 2203/04103; G06F 2203/04107; G06F 2203/04111; G06F 3/0443; G06F 1/182; H05K 1/0216
USPC ............ 324/679; 345/173; 349/12; 361/816; 438/30
See application file for complete search history.

(56) References Cited

U.S. PATENT DOCUMENTS

| | | | | |
|---|---|---|---|---|
| 2005/0237439 A1* | 10/2005 | Mai | ......................... | G06F 1/182 349/12 |
| 2011/0018560 A1* | 1/2011 | Kurashima | .......... | H05K 1/0216 324/679 |
| 2012/0033168 A1* | 2/2012 | Hwang | ................. | G06F 3/0446 438/30 |

(Continued)

*Primary Examiner* — Abdul-Samad A Adediran
(74) *Attorney, Agent, or Firm* — Michael Best & Friedrich LLP

(57) ABSTRACT

Disclosed herein is a touch panel including: a sensor substrate and a cover substrate stuck to each other. The sensor substrate includes a sensor electrode, and plural signal wirings electrically connected to the sensor electrode and extending along a periphery of the sensor electrode. The cover substrate includes one or plural conductive layers extending along the periphery of the sensor electrode and the plural signal wirings within an area not facing the sensor electrode and the plural signal wirings.

10 Claims, 10 Drawing Sheets

(56) References Cited

U.S. PATENT DOCUMENTS

2012/0044662 A1* 2/2012 Kim .................. G06F 3/0443
361/816
2012/0075214 A1* 3/2012 Kim .................. G06F 3/041
345/173

* cited by examiner

FIG.1A
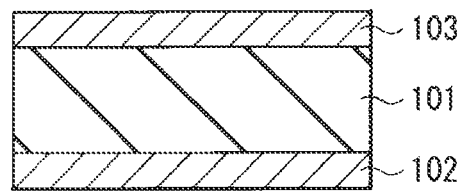
FIG.1B
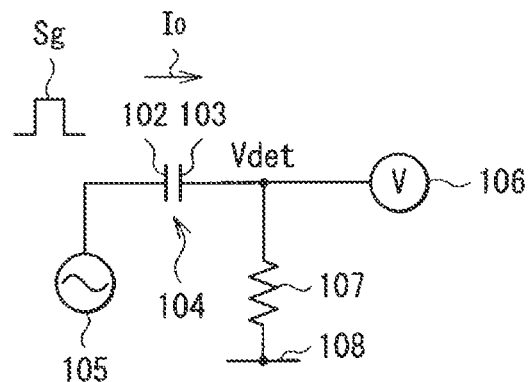
FIG.2A
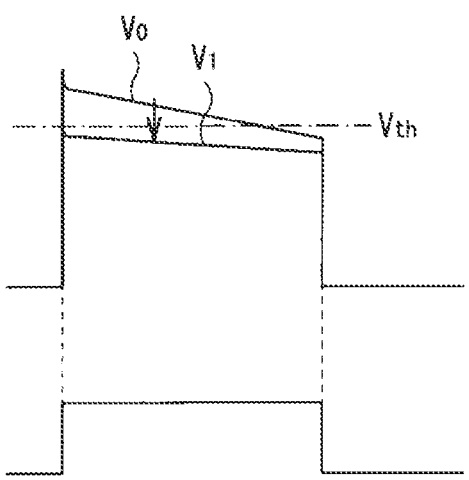
FIG.2B

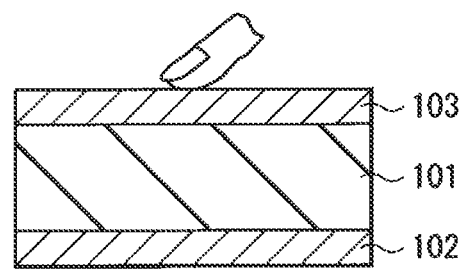
FIG.3A
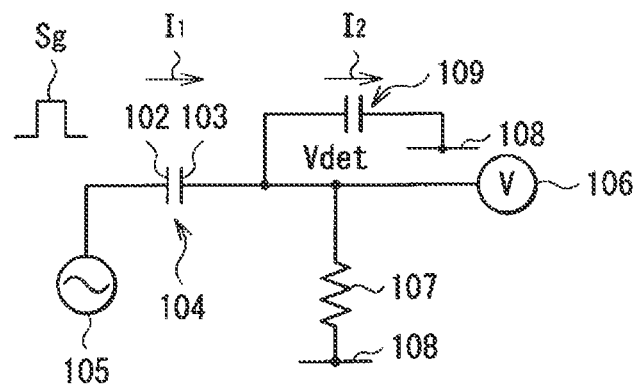
FIG.3B
FIG.4
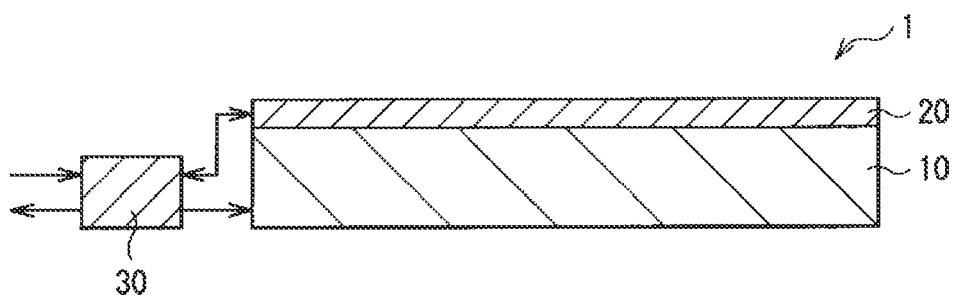

TOUCH PANEL, DISPLAY DEVICE, AND ELECTRONIC APPARATUS

CROSS REFERENCE TO RELATED APPLICATIONS

The present Application is a Continuation Application of U.S. application Ser. No. 17/496,922, filed Oct. 8, 2021, which is a Continuation Application of U.S. application Ser. No. 16/782,922, filed Feb. 5, 2020 and issued as U.S. Pat. No. 11,175,783 on Nov. 16, 2021, which is a Continuation Application of U.S. application Ser. No. 16/004,241, filed Jun. 8, 2018 and issued as U.S. Pat. No. 10,592,020 on Mar. 17, 2020, which is a Continuation Application of U.S. application Ser. No. 13/682,273, filed Nov. 20, 2012 and issued as U.S. Pat. No. 10,019,083 on Jul. 10, 2018 and which claims priority from Japanese Priority Application JP 2012-024896 filed in the Japan Patent Office on Feb. 8, 2012, the entire contents of which are hereby incorporated by reference in their entirety.

BACKGROUND

The present disclosure relates to a touch panel which is capable of detecting a position where an object such as a finger, a hand, an arm or a pen (hereinafter referred to as "a finger or the like") touches a detection surface thereof, a display device including the touch panel, and an electronic apparatus including the display device.

Heretofore, there have been known techniques with each of which information is inputted by touching a detection surface with a finger or the like. Of these techniques, as the technique which receives especially attention, there is known a display device which can carry out information input similar to the case where a normal button is depressed with the finger or the like by touching images of various kinds of button displayed on the display with the finger or the like. The technique relating to this display device provides large merits such as space saving and reduction of the number of parts and components because the common use of the display and the buttons is made possible.

With regard to the touch panel for detecting the contact of the finger or the like, various types of touch panels exist. In this case, an electrostatic capacitance type touch panel is given as the touch panel which generally comes into wide use in a device, such as a smartphone, requiring multi-point detection. This electrostatic capacitance type touch panel, for example, is described in Japanese Patent Laid-Open No. 2011-198207. This electrostatic capacitance type touch panel includes a matrix-like electrode pattern within a detection surface, and is adapted to detect a change in an electrostatic capacitance in a position on a detection surface where the detection surface is touched with the finger or the like.

SUMMARY

Now, in the electrostatic capacitance type touch panel, circuit destruction and a malfunction due to Electro-Static Discharge (ESD) become serious problems. Normally, for the purpose of preventing the ESD from being generated, for example, in a liquid crystal display device, it is well known to provide a guard ring. This technique, for example, is described in Japanese Patent Laid-Open No. 2011-232641. In the touch panel as well, similarly to the case of the liquid crystal display device, it is expected that a guard ring is provided within the same layer as that of a sensor electrode in an outer peripheral portion of the sensor electrode. However, there is caused a problem that when the guard ring is provided in such a position, a frame of the touch panel is widened all the more because the guard ring is provided.

The present disclosure has been made in order to solve the problems described above, and it is therefore desirable to provide a touch panel which is capable of taking the measures to cope with ESD without widening a frame of the touch panel, a display device including the touch panel, and an electronic apparatus including the display device.

In order to attain the desire described above, according to an embodiment of the present disclosure, there is provided a touch panel including: a sensor substrate and a cover substrate stuck to each other. The sensor substrate includes a sensor electrode, and plural signal wirings electrically connected to the sensor electrode and extending along a periphery of the sensor electrode. The cover substrate includes one or plural conductive layers extending along the periphery of the sensor electrode and the plural signal wirings within an area not facing the sensor electrode and the plural signal wirings.

According to another embodiment of the present disclosure, there is provided a display device. The display device includes: an image generating device configured to generate an image; a touch panel disposed on a surface of the image generating device; and a controller configured to control the image generating device and the touch panel. The touch panel includes a sensor substrate and a cover substrate stuck to each other. The sensor substrate includes a sensor electrode, and plural signal wirings electrically connected to the sensor electrode and extending along a periphery of the sensor electrode. The cover substrate includes one or plural conductive layers extending along the periphery of the sensor electrode and the plural signal wirings within an area not facing the sensor electrode and the plural signal wirings.

According to still another embodiment of the present disclosure, there is provided an electronic apparatus. The electronic apparatus includes a display device. The display device includes an image generating device configured to generate an image, a touch panel disposed on a surface of the image generating device, and a controller configured to control the image generating device and the touch panel. The touch panel includes a sensor substrate and a cover substrate stuck to each other. The sensor substrate includes a sensor electrode, and plural signal wirings electrically connected to the sensor electrode and extending along a periphery of the sensor electrode. The cover substrate includes one or plural conductive layers extending along the periphery of the sensor electrode and the plural signal wirings within an area not facing the sensor electrode and the plural signal wirings.

In the touch panel according to the embodiment of the present disclosure, the display device according to another embodiment of the present disclosure, and the electronic apparatus according to still another embodiment of the present disclosure, the one or plural conductive layers extending along the periphery of the sensor electrode and the plural signal wirings are provided within the area not facing the sensor electrode and the plural signal wirings. As a result, the one or plural conductive layers function as a guard ring for the measure taken to cope with the ESD. In addition, in the present disclosure, the one or plural conductive layers are provided on the cover substrate. Here, in the cover substrate, the periphery of the sensor electrode and the plural signal wirings is normally an area in which a fixing layer is provided which is used when the touch panel is stuck to a chassis or the like. In a word, in the present disclosure, the one or plural conductive layers functioning as the guard ring for the countermeasure taken to cope with the ESD are provided within the area in which the fixing layer described above is provided. Therefore, it is unnecessary to newly provide a space for the guard ring for the countermeasure taken to cope with the ESD in an in-plane layout of the touch panel.

As set forth hereinabove, according to the present disclosure, in the in-plane layout of the touch panel, it is unnecessary to newly provide the space for the guard ring for the countermeasure taken to cope with the ESD. Therefore, it is possible to take the measure to cope with the ESD without widening the frame of the touch panel.

BRIEF DESCRIPTION OF THE DRAWINGS

FIGS. 1A and 1B are respectively a cross sectional view schematically showing a structure of a touch sensor and explaining the basic principles of an operation detection system used in a display device according to a first embodiment of the present disclosure in a state of non-contact, and a circuit diagram showing an equivalent circuit of the touch sensor shown in FIG. 1A, and a peripheral circuit connected to the touch sensor in the state of the non-contact;

FIGS. 2A and 2B are respectively waveform charts, of a detected signal and a drive signal for the touch sensor, explaining the operation principles of the touch detection system used in the display device according to the first embodiment of the present disclosure;

FIGS. 3A and 3B are respectively a cross sectional view schematically showing the structure of the touch sensor and explaining the basic principles of the operation of the touch detection system used in the display device according to the first embodiment of the present disclosure in a state of finger contact, and the peripheral circuit connected to the touch sensor in the state of the finger contact;

FIG. 4 is a cross sectional view showing a cross-sectional structure of the display device according to the first embodiment of the present disclosure;

DETAILED DESCRIPTION OF THE PREFERRED EMBODIMENTS

Figure 5:
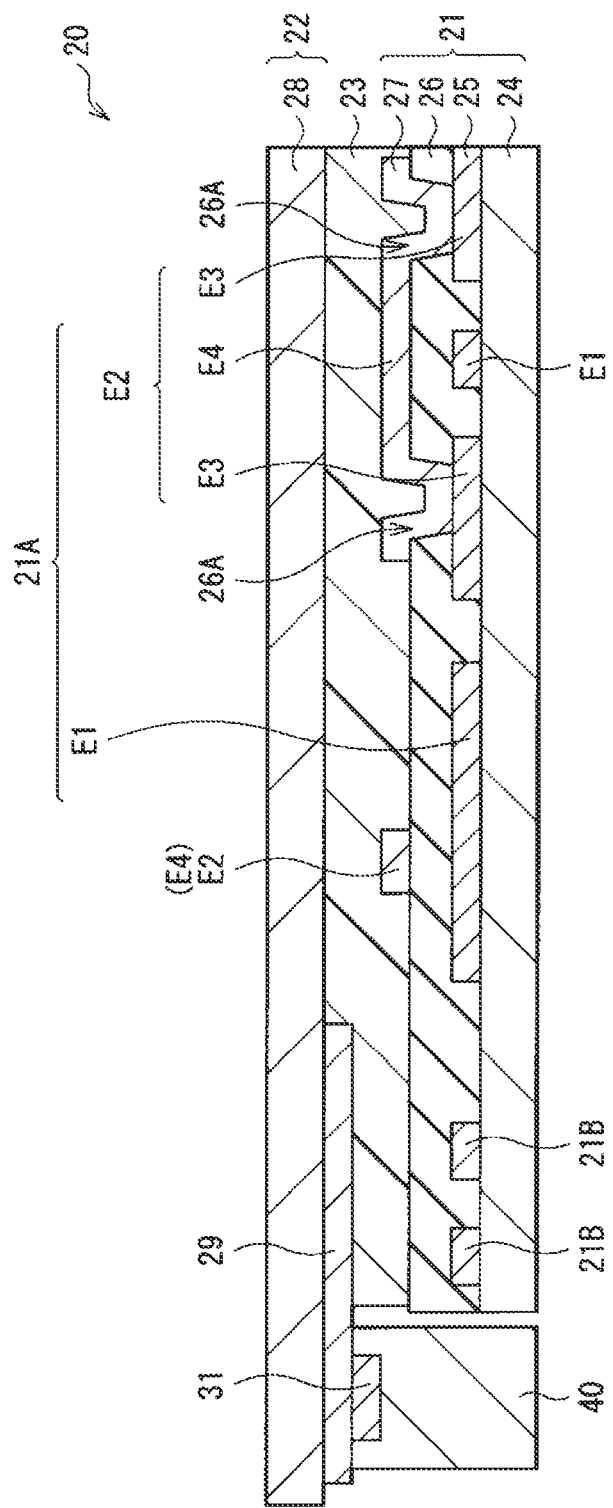
FIG. 5 is a cross sectional view showing a cross-sectional structure of a touch panel shown in FIG. 4.

Embodiments of the present disclosure will be described in detail hereinafter with reference to the accompanying drawings. It is noted that the description will be given below in accordance with the following order.

1. Basic Principles of Touch Detection System
2. First Embodiment (Display Device)
3. Modified Changes
4. Second Embodiment (Touch Panel)
5. Third Embodiment (Electronic Apparatus)
6. Example of Application 1. Basic Principles of Touch Detection System Firstly, a description will be given with respect to the basic principles of a touch detection system used in a display device according to a first embodiment of the present disclosure. This touch detection system is embodied in the form of an electrostatic capacitance type touch sensor. FIG. 1A is a cross sectional view schematically showing a structure of the touch sensor described above in a state of non-contact. Also, FIG. 1B is a circuit diagram showing an equivalent circuit of the touch sensor shown in FIG. 1A, and a peripheral circuit which is connected to the touch sensor. The touch sensor includes a dielectric 101, and a pair of electrodes 102 and 103 which are disposed so as to hold the dielectric 101 between them, and so as to face each other. The dielectric 101, and the pair of electrodes 102 and 103 are expressed in the form of a capacitative element 104 in the equivalent circuit as shown in FIG. 1B.

One terminal, that is, the electrode 102 of the capacitative element 104 is connected to an alternate-current signal source 105. The other terminal, that is, the electrode 103 of the capacitative element 104 is connected to a voltage detecting circuit 106, and is further connected to a reference electric potential line 108 through a resistor 107. The alternate-current signal source 105 outputs an alternate-current rectangular wave signal Sg having a predetermined frequency (for example, in the range of about several kHz to about more than ten kHz). The voltage detecting circuit 106 detects a crest value of a signal inputted thereto, and determines whether or not a finger of a user touches the touch sensor in accordance with the detected voltage. The reference electric potential line 108, for example, is electrically connected to a member (for example, a grounding layer of a printed circuit or a conductive chassis) which gives an electric potential becoming a reference for a circuit operation in a device to which the touch sensor is mounted. Thus, while the reference electric potential line 108 is electrically connected to the member concerned, the reference electric potential line 108 has the same electric potential (reference electric potential) as that of the member concerned. The reference electric potential, for example, is the grounding electric potential.

In the touch sensor, when the alternate-current rectangular wave signal Sg (refer to FIG. 2B) is applied from the alternate-current signal source 105 to the electrode 102, an output waveform (of a detected signal Vdet) as shown in FIG. 2A appears in the electrode 103.

In a state in which an object of the finger or the like does not touch the touch sensor (refer to FIG. 1A), as shown in FIG. 1B, a current I0 corresponding to a capacitative value of the capacitative element 104 is caused to flow through the capacitative element 104 along with charge/discharge to/from the capacitative element 104. A waveform of an electric potential on the electrode 103 side of the capacitative element 104, for example, becomes like a waveform V0 shown in FIG. 2A which is in turn detected by the voltage detecting circuit 106.

On the other hand, in a state in which the object of the finger or the like contacts the touch sensor (refer to FIG. 3A), as shown in FIG. 3B, a capacitative element 109 formed by the object of the finger or the like is added in series with the capacitative element 104. In this state, currents I1 and I2 are caused to flow through the capacitative elements 104 and 109 along with the charge/discharge to/from the capacitative elements 104 and 109, respectively. At this time, the waveform of the electric potential in the electrode 103, for example, becomes like a waveform V1 shown in FIG. 2A which is in turn detected by the voltage detecting circuit 106. The electric potential in the electrode 103 becomes a divided electric potential which is determined depending on values of the currents I1 and I2 which are caused to flow through the capacitative elements 104 and 109, respectively. For this reason, the waveform V1 has a smaller value than that of the waveform V0 in the non-contact state. After that, the voltage detecting circuit 106 compares the detected voltage and a predetermined threshold voltage Vth with each other. When it proves from the comparison result that the detected voltage is equal to or smaller than the predetermined threshold voltage Vth, the state is determined to be the non-contact state. On the other hand, when it proves from the comparison result that the detected voltage is larger than the predetermined threshold voltage Vth, the state is determined to be the contact state. The touch detection is carried out in such a manner. It is noted that in a display device of a first embodiment which will be described below, a detection system different from that described above may also be used.

2. First Embodiment (Display Device)

Structure

FIG. 4 shows a cross-sectional structure of a display device 1 according to a first embodiment of the present disclosure. The display device 1 of the first embodiment is a display device with a touch sensor, and includes an image generating device 10, an electrostatic capacitance type touch panel 20, and a controller 30. The touch panel 20 is formed separately from the image generating device 10, and is disposed on a surface of the image generating device 10. The controller 30 controls both of the image generating device 10 and the touch panel 20. Specifically, the controller 30 drives the image generating device 10 based on a video signal inputted from the outside. Also, the controller 30 drives the touch panel 20 and outputs a signal corresponding to a detected signal from the touch panel 20 to the output.

Image Generating Device 10

The image generating device 10 generates an image in accordance with a signal inputted thereto from the controller 30. The image generating device 10 is composed of a liquid crystal display panel and a light source. In this case, the liquid crystal display panel transmits and modulates an incident light by changing an alignment of liquid crystal molecules, thereby generating an image. Also, the light source illuminates the liquid crystal display panel from a back side. It is noted that the image generating device 10 may adopt a structure different from that described the above and, for example, may be composed of an organic EL display panel for causing an organic EL element to emit a light, thereby generating an image.

Touch Panel 20

Figure 6:
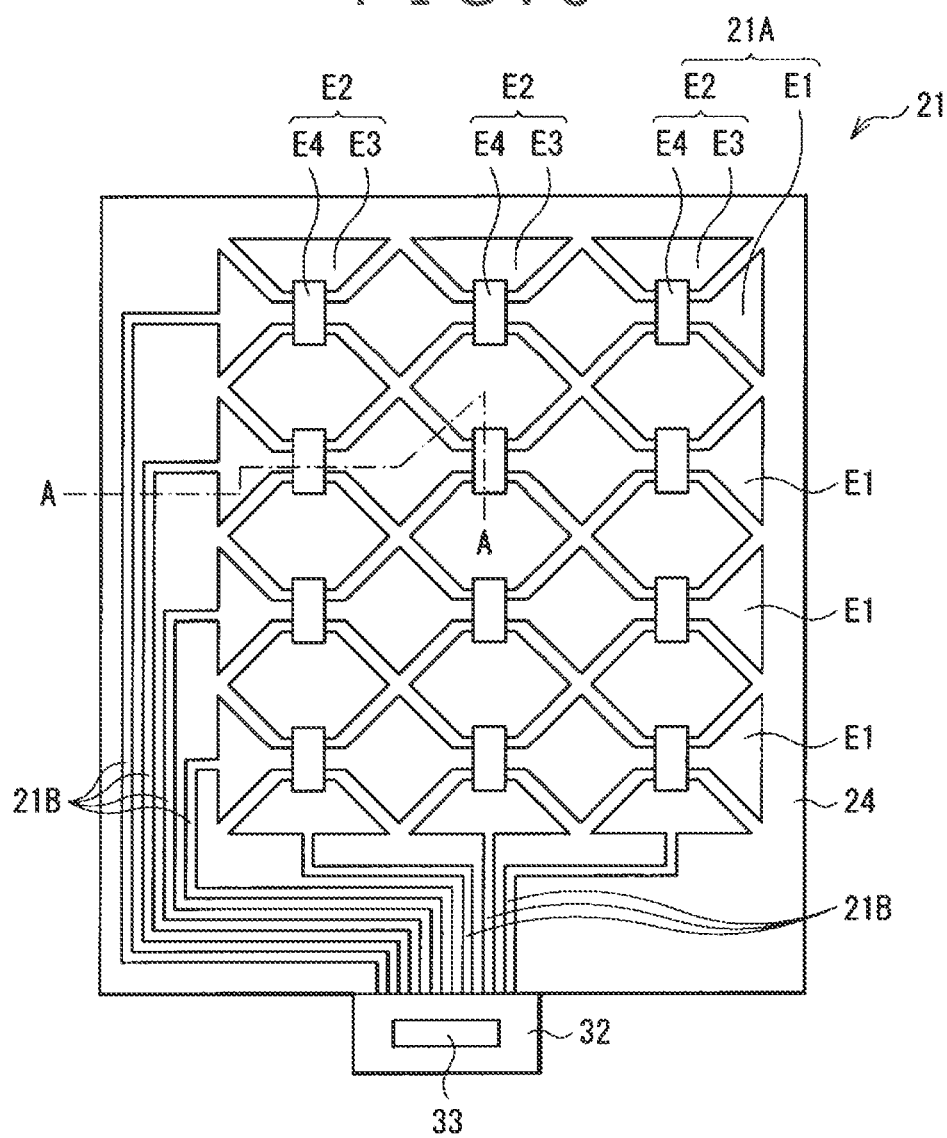
FIG. 6 is a top plan view showing a layout of an electrode pattern of the touch panel shown in FIG. 5.

FIG. 5 shows a cross-sectional structure of the touch panel 20. FIG. 6 shows a layout of an electrode pattern of the touch panel 20. It is noted that FIG. 5 shows the cross-sectional structure of a portion, corresponding to line A-A of FIG. 6, of the touch panel 20.

The touch panel 20 is such that an image display surface (a detection surface of the touch panel 20) of the display device 1 is touched by the finger or the like, thereby inputting information. The touch panel 20, for example, corresponds to a concrete example of the electrostatic capacitance type touch sensor described above, and detects whether or not the finger or the like touches the detection surface with an XY-matrix. The touch panel 20, for example, is stuck to a surface of either a chassis (not shown) or the image generating device 10 of the display device 1 through either an adhesive bonding layer or a pressure-sensitive adhesive layer. Also, the touch panel 20, for example, as shown in FIG. 5, is stuck to the surface of either the chassis (not shown) or the image generating device 10 of the display device 1 through a fixing layer 40 provided in an outer edge of the touch panel 20. Here, the fixing layer 40 is used when the touch panel 20 is stuck to either the chassis (not shown) or the image generating device 10 of the display device 1. The fixing layer 40 is made of a material having both of elasticity and viscosity and, for example, is composed of a pressure-sensitive adhesive tape. In addition thereto, the fixing layer 40 may be made of a material having a conductive property and, for example, is composed of a conductive pressure-sensitive adhesive tape. It is noted that the fixing layer 40 may have an insulating property.

The touch panel 20 is formed in such a way that the sensor substrate 21 and the cover substrate 22 are stuck to each other through the fixing layer 23. The fixing layer 23, for example, is formed by curing a UV curable resin. The sensor substrate 21 and the cover substrate 22 are disposed so as to face each other through the fixing layer (adhesive layer) 23. The sensor substrate 21, for example, is formed in such a way that a conductive layer 25, an insulating layer 26, and a conductive layer 27 are laminated on an upper surface of a substrate 24 (a surface on the cover substrate 22 side) in this order. The cover substrate 22, for example, is formed in such a way that a light blocking layer 29, and one or plural conductive layers 31 are provided on a lower surface of a substrate 28 (a surface on the sensor substrate 21 side). The substrate 28 is larger in size than the substrate 24 and, for example, is slightly larger in size than the substrate 24. In a word, the substrate 28 has a circular area which does not face the substrate 24.

The substrate 24 is a substrate on which the conductive layer 25, the insulating layer 26, and the conductive layer 27 are formed in this order, and thus holds the conductive layer 25, the insulating layer 26, and the conductive layer 27. The substrate 24 is composed of an insulating and light transmissive member and, for example, is composed of a glass substrate, or an insulating and light transmissive resin film. The substrate 28 is a substrate which composes the detection surface and covers the conductive layer 25 and the like. The substrate 28 also holds the light blocking layer 29 and the one or plural conductive layers 31. The substrate 28 is composed of an insulating and light transmissive member and, for example, is composed of a glass substrate, or an insulating and light transmissive resin film.

The conductive layers 25 and 27 serve to detect contact/non-contact of the finger or the like to the detection surface. Each of the conductive layers 25 and 27, for example, is made of a light transmissive conductive material such as an Indium Tin Oxide (ITO). The insulating layer 26 is disposed between the conductive layer 25 and the conductive layer 27. The insulating layer 26 serves to isolate a first electrode E1 and a second electrode E2 which will be described later from each other and, for example, is made of a light transmissive insulating material. The insulating layer 26 has contact holes 26A in positions corresponding to both end portions of an island-like electrode E3 which will be described later, respectively. A light transmissive insulating material used for the insulating layer 26, for example, includes an acrylic resin or an inorganic material containing therein $SiO_2$ and the like as a principal component. The light blocking layer 29 serves to prevent silhouettes of the one or plural conductive layers 31 and signal wirings 21B which will be described later from being visually recognized on the image display surface. Thus, the light blocking layer 29 is made of a light blocking material. Although a color of the light blocking material is typically black, any other suitable color (for example, white) other than black may also be adopted as the color of the light blocking material.

The conductive layer 25 and the conductive layer 27 are composed of sensor electrodes 21A, and plural signal wirings 21B. In this case, the contact/non-contact of the finger or the like to the detection surface is detected through the sensor electrodes 21A. Also, the sensor electrodes 21A and the controller 30 are connected to each other through the plural signal wirings 21B. The sensor electrodes 21A are disposed in a position corresponding to a portion, except for the outer edge, of the upper surface of the substrate 24. The plural signal wirings 21B are disposed in a position, corresponding to the outer edge, of the upper surface of the substrate 24, and extend along a periphery of the sensor electrodes 21A.

The sensor electrodes 21A are composed of plural first electrodes E1 and plural second electrodes E2. In this case, the plural first electrodes E1 extend in a predetermined direction. Also, the plural second electrodes E2 extend in a direction intersecting with (for example, perpendicular to) the plural first electrodes E1. Each of the plural first electrodes E1 is composed of a part of the conductive layer 25. In a word, the conductive layer 25 includes the plural first electrodes E1. The plural first electrodes E1 are formed so as to contact an upper surface of the substrate 24 (a surface on the cover substrate 22 side). Also, plural first electrodes E1 are strip-like electrodes composed of plural island-like electrodes and coupling electrodes through each of which each adjacent two island-like electrodes are coupled to each other. Here, a width of each of the coupling electrodes is narrower than that of each of the island-like electrodes.

Each of the second electrodes E2 is composed of a part of the conductive layer 25, and all of or a part of the conductive layer 27. In a word, the conductive layer 25 is composed of all of the first electrodes E1, and a part of the second electrodes E2. Also, the conductive layer 27 is composed of a part of the second electrodes E2. The second electrodes E2 are strip-like electrodes composed of plural island-like electrodes E3 disposed in the same layer as that of the first electrodes E1, and relay electrodes E4. In this case, each adjacent two island-like electrodes E3 are electrically connected to each other through the corresponding one of the relay electrodes E4. Also, the relay electrode E4 straddles each adjacent two first electrodes E1 (specifically, each adjacent two coupling electrodes). In a word, the conductive layer 25 is composed of all of the first electrodes E1 and the island-like electrodes E3. Also, the conductive layer 27 is composed of the relay electrodes E4. Here, a width of each of the relay electrodes E4 is narrower than that of each of the island-like electrodes E3. In addition, the island-like electrodes E3, and the island-like electrodes of the first electrodes E1 are disposed in a delta pattern.

Each of the relay electrodes E4 has a strip-like shape extending in an extension direction of each of the second electrodes E2. In each of the relay electrodes E4, one end thereof is connected to one island-like electrode E3, and the other end thereof is connected to another island-like electrode E3. Also, a portion thereof straddling each adjacent two first electrodes E1 is disposed in a layer above each of the first electrodes E1. "The layer above each of the first electrodes E1" means the layer contacting an upper surface of the insulating layer 26, and specifically means the conductive layer 27. Therefore, each of the relay electrodes E4 is disposed closer to the substrate 28 than each of the island-like electrodes E3. The relay electrodes E4 are collectively formed in a manufacturing process and thus are composed of a single layer. On the other hand, the island-like electrodes E3 and the first electrodes E1 are together formed in a common manufacturing process, and thus the island-like electrodes E3 and the first electrodes E1 are made of the same material.

A part of both end portions, in a longitudinal direction, of each of the relay electrodes E4 is disposed within the contact hole 26A in the insulating layer 26. In a word, the insulating layer 26 has the contact holes 26A in the positions corresponding to the both end portions, in the longitudinal direction, of each of the relay electrodes E4, respectively. Each of the contact holes 26A, for example, is disposed in a position where an upper surface of each of the island-like electrodes E3 is exposed within a bottom surface of the contact hole 26A. Therefore, each of the relay electrodes E4 contacts a portion, exposed within the control hole 26A, of each of the island-like electrodes E3 and is isolated from each of the first electrodes E1 through the insulating layer 26.

The signal wirings 21B are electrically connected to the sensor electrodes 21A and extend along the periphery of the sensor electrodes 21A. A part of the plural signal wirings 21B is electrically connected to the first electrodes E1, and the signal wirings 21B, which are un-connected to the first electrodes E1, of the plural signal wirings 21B are electrically connected to the second electrodes E2.

Next, the conductive layer 31 will be described. The conductive layer 31 is provided so as to contact the surface of the light blocking layer 29. The conductive layer 31 has a width thicker than that of each of the signal wirings 21B. The conductive layer 31 is preferably sufficiently thinner than the fixing layer 40. The conductive layer 31 is made of a metallic material and, for example, is made of a low-resistance material such as a conductive paste or a silver paste. The conductive layer 31 is provided within an area which does not face each of the sensor electrodes 21A and the signal wirings 21B, and extends along the periphery of the sensor electrodes 21A and the signal wirings 21B. Therefore, the conductive layer 31 functions as a guard ring for the countermeasure taken to cope with the ESD. Here, in the cover substrate 22, the periphery of the sensor electrode 21A and the signal wirings 21B is normally an area in which the fixing layer 40 used when the touch panel 20 is stuck to the chassis or the like is provided. In a word, one or plural conductive layers 31 functioning as the guard ring for the countermeasure taken to cope with the ESD are provided within the area in which the fixing layer 40 is provided. Therefore, in the in-plane layout of the touch panel 20, a space of the one or plural conductive layers 31 is not provided so as to be dedicated to the one or plural conductive layers 31.

Figure 7:
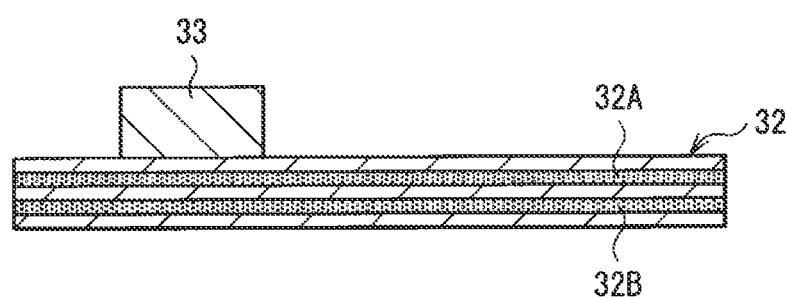
FIG. 7 is a cross sectional view showing a cross-sectional view of a Flexible Printed Circuits (FPC) shown in FIG. 6.

The touch panel 20, as shown in FIGS. 6 and 7, further includes a Flexible Printed Circuit (FPC) connected to the sensor substrate 21, and an IC 33 disposed on the FPC 32. The FPC 32 includes a wiring layer 32A and a fixing electric potential layer 32B. The wiring layer 32A is composed of plural signal wirings which, for example, are in turn electrically connected to the signal wirings 21B on one-by-one basis through an Anisotropic Conductive Film (ACF), respectively. The fixing electric potential layer 32B is formed in a large area within the FPC 32 and, for example, is a layer which, for example, is set to the grounding electric potential as a reference electric potential. The fixing electric potential layer 32B, for example, is electrically connected to the one or plural conductive layers 31 through a conductive paste, a silver paste or the like. In a word, the one or plural conductive layers 31 have the same electric potential as that of the fixing electric potential layer 32B.

Here, the fixing electric potential layer 32B, and the one or plural conductive layers 31, for example, are electrically connected to each other through a low-resistance material such as a conductive paste or a silver paste. A resistance value of the low-resistance material such as a conductive paste or a silver paste is equal to that of each of the fixing electric potential layer 32B, and the one or plural conductive layers 31. For this reason, when a current due to the ESD is caused to flow from the one or plural conductive layers 31 to the fixing electric potential layer 32B through the low-resistance material such as a conductive paste or a silver paste, the low-resistance material such as a conductive paste or a silver paste is prevented from becoming a resistor to be heated. It is noted that although the ACF is also a low-resistance material, a resistance value of the ACF is slightly larger than that of the low-resistance material such as a conductive paste or a silver paste. Therefore, it is not preferable so much that the ACF is used in a portion through which the current due to the ESD is caused to flow.

Figure 8:
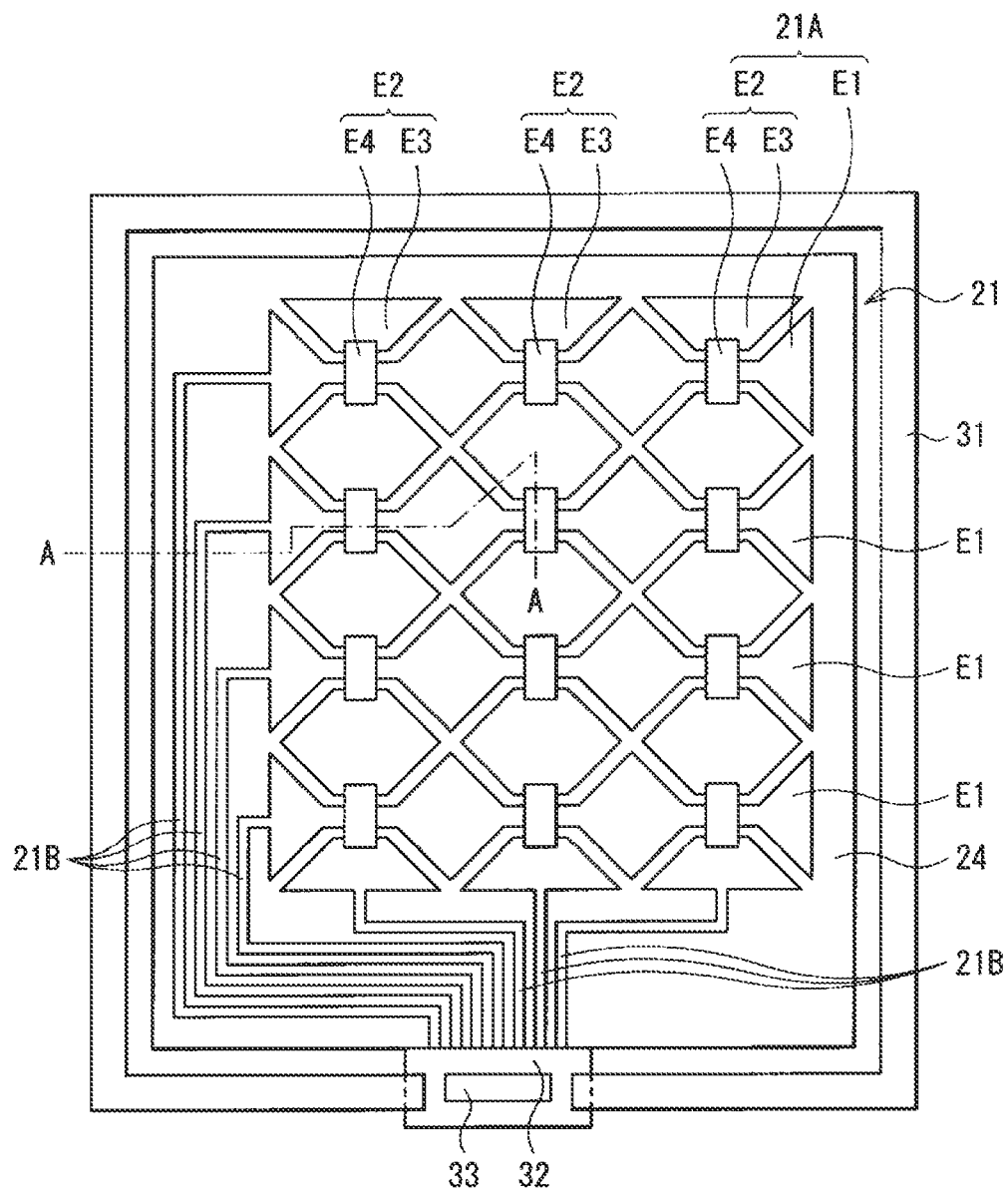
FIG. 8 is a top plan view showing an electrode pattern of the touch panel shown in FIG. 5, and a layout of conductive layers on a cover substrate side.
Figure 9:
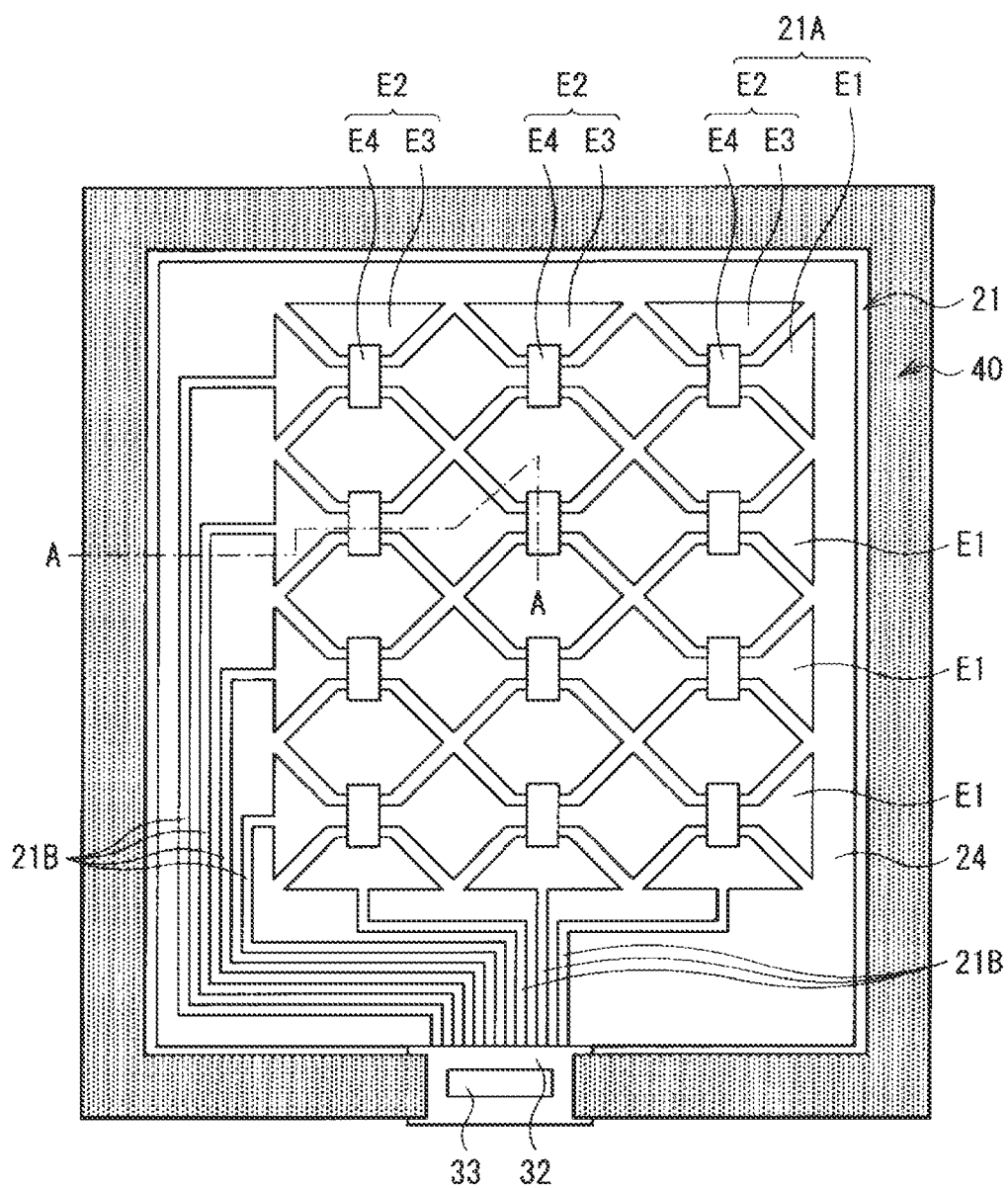
FIG. 9 is a top plan view showing an electrode pattern of the touch panel shown in FIG. 5, and a layout of a fixing layer on the cover substrate side.

FIG. 8 is a top plan view showing the electrode pattern of the touch panel 20, and a layout of the one or plural conductive layers 31. FIG. 9 is a top plan view showing the electrode pattern of the touch panel 20, and a layout of the fixing layer 40. The one or plural conductive layers 31 and the fixing layer 40 extend along the periphery of the sensor electrodes 21A and the signal wirings 21B. The one or plural conductive layers 31 and the fixing layer 40, for example, are cut out in the vicinity of the FPC 32 in order to avoid the interference with the IC 33.

Manufacturing Method

Figure 10:
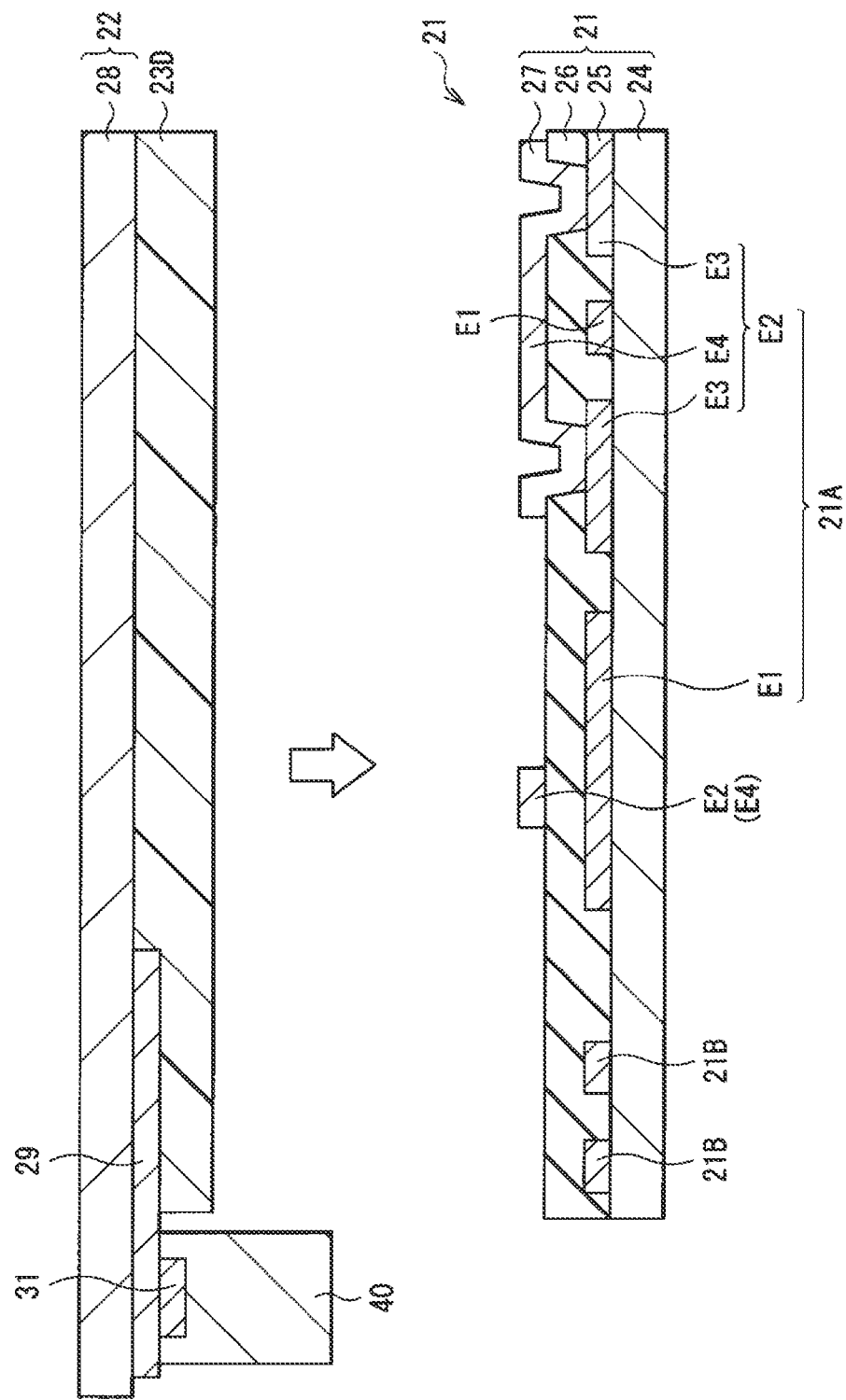
FIG. 10 is a cross sectional view explaining a method of manufacturing the display device of the first embodiment including the touch panel shown in FIG. 5.

Next, a description will now be given with respect to a method of manufacturing the display device 1 according to the first embodiment of the present disclosure. Firstly, the sensor substrate 21 including the sensor electrodes 21A and the plural signal wirings 21B is prepared as well as the cover substrate 22 including the one or plural conductive layers 31 and the light blocking layer 29 is prepared (refer to FIG. 10). At this time, as shown in FIG. 10, an ultraviolet curable resin 23D is applied onto the cover substrate 22. In addition, the fixing layer 40 is previously stuck to the one or plural conductive layers 31. Next, as shown in FIG. 10, the sensor substrate 21 and the cover substrate 22 are stuck to each other through the ultraviolet curable resin 23D.

Next, for example, an ultraviolet light is radiated from the cover substrate 22 side, thereby curing the ultraviolet curable resin 23D. As a result, the sensor substrate 21 and the cover substrate 22 are fixed to each other by the fixing layer 23. The touch panel 20 is completed in such a manner. Next, for example, the touch panel 20, and the chassis or the image generating device 10 are stuck to each other through the fixing layer 40 provided in the outer edge of the touch panel 20. After that, although not illustrated, the controller 30 is connected to both of the touch panel 20 and the image generating device 10. The display device 1 is completed in such a manner.

It is noted that with regard to the fixing layer 40, after the sensor substrate 21 and the cover substrate 22 may be stuck to each other through the ultraviolet curable resin 23D, the sensor substrate 21 and the cover substrate 22 thus stuck to each other may be stuck to the conductive layer 31.

Operation

Next, a description will now be given with respect to an operation of the display device 1 according to the first embodiment of the present disclosure. Firstly, for example, the controller 30 starts an operation of the touch panel 20 by activating a power source of the display device 1. Firstly, the controller 30 selects corresponding one(s) from the one or plural electrodes (the first electrodes E1 and the second electrodes E2) included in the sensor electrodes 21A and applies an alternate-current signal to the electrode(s) thus selected. At this time, if the finger or the like contacts the detection surface, the controller 30 detects a change in the electrostatic capacitance generated in the sensor electrodes 21A by the contact of the finger or the like to the detection surface in the form of a change in an output voltage. The controller 30 derives the coordinates of the position where the finger or the like contacts the detection surface based on the information on the output voltage thus detected (or the change in the output voltage). Thus, the controller 30 outputs information on the derived coordinates of the position where the finger or the like contacts the detection surface to the outside.

Effects

Next, a description will now be given with respect to the effects of the display device 1 according to the first embodiment of the present disclosure. In the first embodiment of the present disclosure, the one or plural conductive layers 31 extending along the periphery of the sensor electrodes 21A and the signal wirings 21B are provided within the area which does not face the sensor electrodes 21A and the signal wirings 21B. As a result, the one or plural conductive layers 31 function as the guard ring for the countermeasure taken to cope with the ESD. In addition, in the first embodiment of the present disclosure, the one or plural conductive layers 31 are provided on the cover substrate 22. Here, in the cover substrate 22, the periphery of the sensor electrode 21A and the signal wirings 21B is normally the area in which the fixing layer 40 used when the touch panel 20 is stuck to the chassis or the like is provided. In a word, in the first embodiment of the present disclosure, the one or plural conductive layers 31 functioning as the guard ring for the countermeasure taken to cope with the ESD are provided within the area in which the fixing layer 40 is provided. For this reason, in the in-plane layout of the touch panel 20, the space of the one or plural conductive layers 31 needs not be newly provided. As a result, it is possible to take the measures to cope with the ESD without widening the frame of the touch panel 20.

3. Modified Changes

Although the present disclosure has been described so far by giving the first embodiment, the present disclosure is by no means limited to the first embodiment and thus various kinds of modified changes thereof can be made.

First Modified Change

Figure 11:
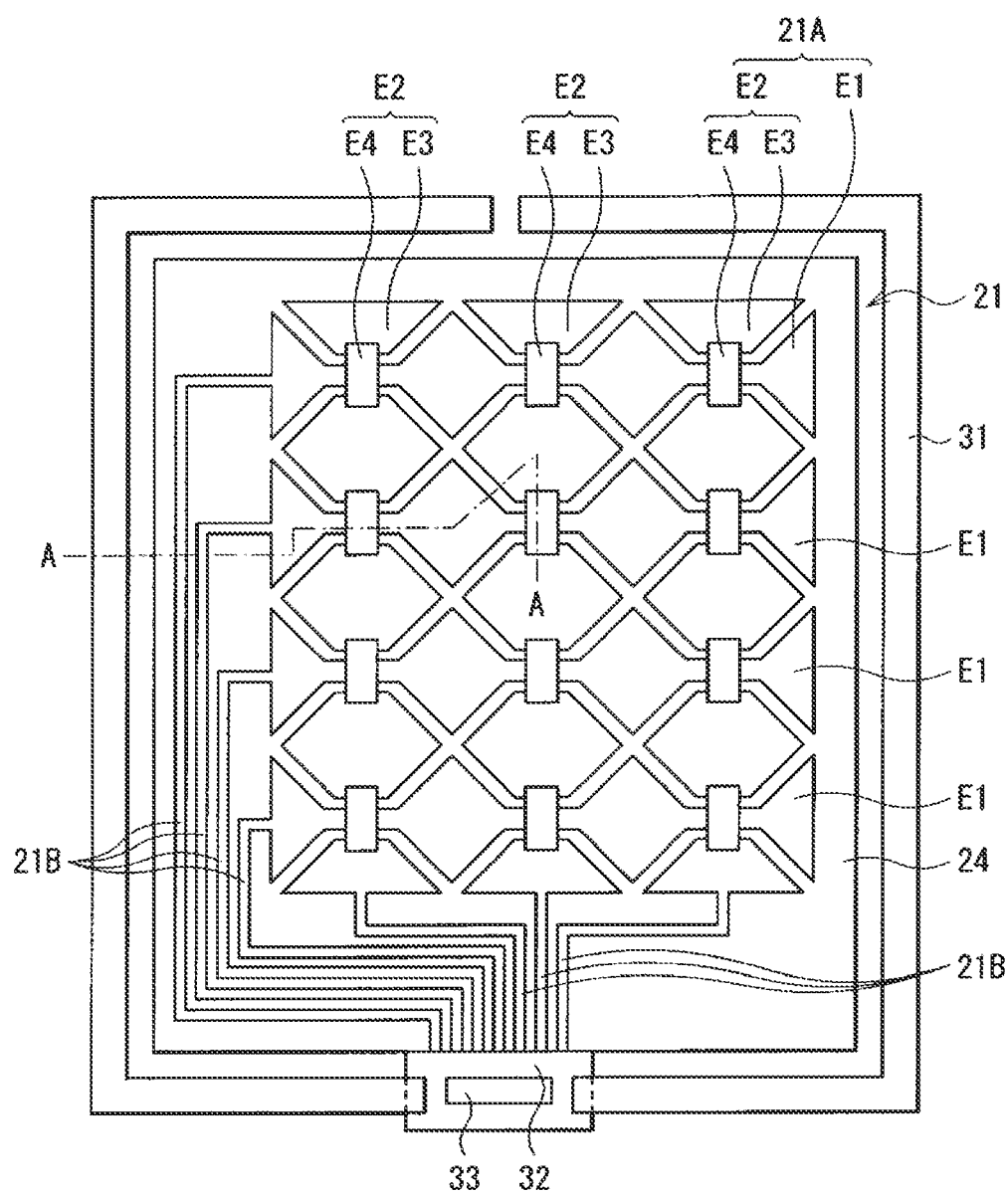
FIG. 11 is a top plan view showing an electrode pattern of the touch panel, and a layout of the conductive layers on the cover substrate side according to a first modified change of the first embodiment of the present disclosure.

For example, in the first embodiment described above, the case where one conductive layer 31 extends along the periphery of the sensor electrodes 21A and the signal wirings 21B is exemplified. For example, however, as shown in FIG. 11, plural conductive layers 31 may extend along the periphery of the sensor electrodes 21A and the signal wirings 21B. In this case, however, each of the plural conductive layers 31 is preferably electrically connected to the fixing electric potential layer 32B of the FPC 32.

Second Modified Change

Figure 12:
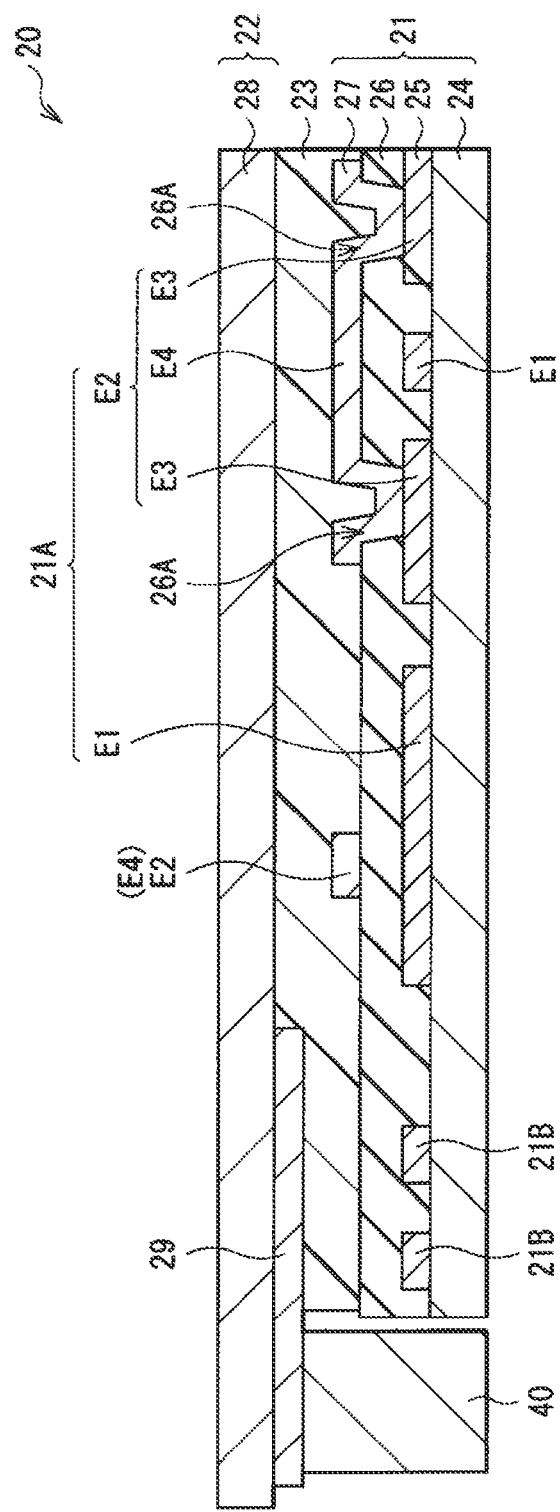
FIG. 12 is a cross sectional view showing a cross-sectional structure of the touch panel, shown in FIG. 4, according to a second modified change of the first embodiment of the present disclosure.

In each of the first embodiment and the first modified change thereof described above, the one or plural conductive layers 31 are provided on the cover substrate 22. For example, however, as shown in FIG. 12, the one or plural conductive layers 31 may be removed away. In this case, however, the fixing layer 40 needs to have the conductive property. Here, the fixing layer 40 is preferably electrically connected to the portion having either the reference electric potential or the fixed electric potential and, for example, preferably contacts the chassis having the grounding electric potential.

4. Second Embodiment (Touch Panel)

The touch panel 20 according to a second embodiment of the present disclosure, as described above, includes the sensor substrate 21 and the cover substrate 22 stuck to each other. In this case, the sensor substrate 21 includes the sensor electrode 21A, and the plural signal wirings 21B electrically connected to the sensor electrode 21A and extending along the periphery of the sensor electrode 21A. Also, the cover substrate 22 includes the one or plural conductive layers 31 extending along the periphery of the sensor electrode 21 and the plural signal wirings 21B within the area which does not face the sensor electrode 21 and the plural signal wirings 21B.

5. Third Embodiment (Electronic Apparatus)

An electronic apparatus according to a third embodiment of the present disclosure includes the display device 1 of the first embodiment. In this case, the display device 1, as described above, includes the image generating device 10 for generating an image, the touch panel 20 disposed on the surface of the image generating device 10, and the controller 30 for controlling the image generating device 10 and the touch panel 20. Also, the touch panel 20 includes the sensor substrate 21 and the cover substrate 22 stuck to each other. In this case, the sensor substrate 21 includes the sensor electrode 21A, and the plural signal wirings 21B electrically connected to the sensor electrode 21A and extending along the periphery of the sensor electrode 21A. Also, the cover substrate 22 includes the one or plural conductive layers 31 extending along the periphery of the sensor electrode 21 and the plural signal wirings 21B within the area which does not face the sensor electrode 21 and the plural signal wirings 21B.

It is noted that the electronic apparatus of the third embodiment including the display device 1 of the first embodiment, for example, includes a mobile phone, a personal computer, a liquid crystal television set, a view finder type or monitor direct-view-type video tape recorder, a car navigation device, a pager, an electronic databook, a calculator, a word processor, a work station, a TV telephone set, a POS terminal device, and the like.

It is noted that although the electronic apparatus of the third embodiment includes the display device 1 of the first embodiment, alternatively, the electronic apparatus of the third embodiment can also include any of the display devices according to the first and second modified examples of the first embodiment.

6. Example of Application

Figure 13:
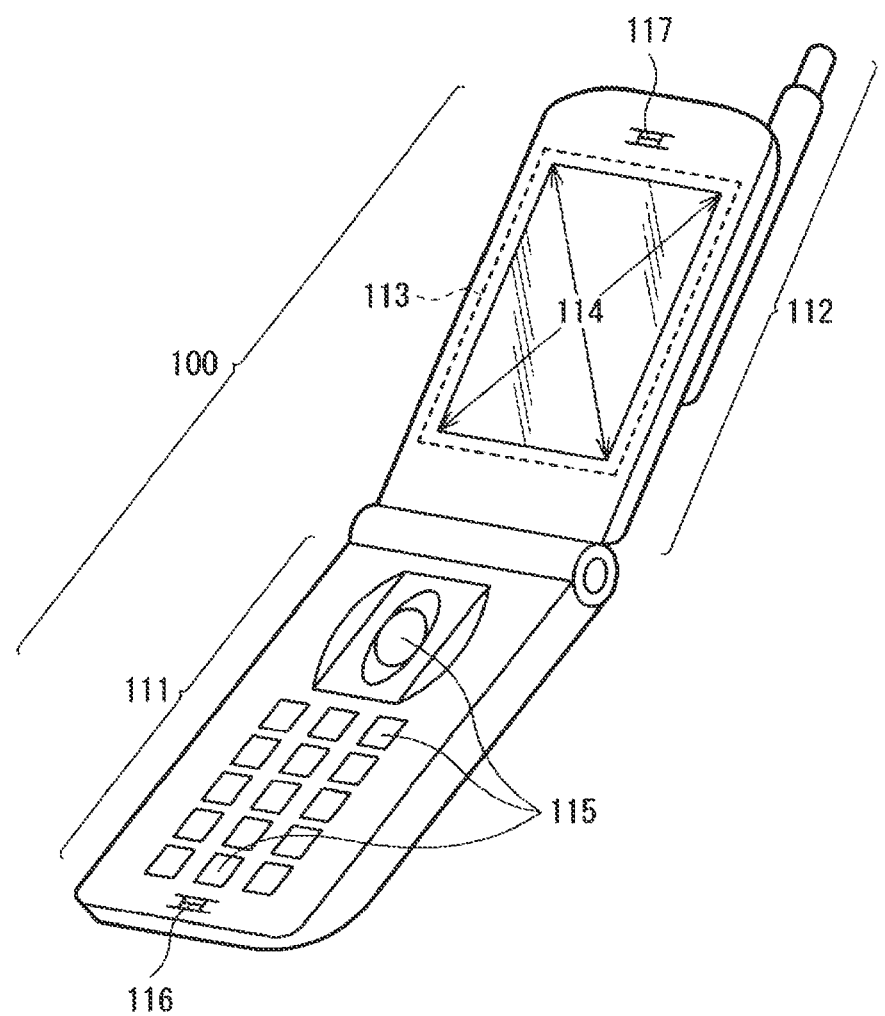
FIG. 13 is a perspective view showing a construction of an electronic apparatus according to an example of application to which the display device according to the first embodiment of the present disclosure is applied.

Next, a description will be given below with respect to an example of application in which the display device 1 of the first embodiment is applied to the electronic apparatus of the third embodiment. FIG. 13 is a perspective view showing a schematic construction of an electronic apparatus 100 according to the example of application. The electronic apparatus 100 is a mobile phone. For example, as shown in FIG. 13, the electronic apparatus 100 includes a main body portion 111 and a display portion 112 which is provided so as to be openable and closable for the main body portion 111. The main body portion 111 includes a manipulation button 115 and a transmitter portion 116. The display portion 112 includes a display device 113 and a receiver portion 117. The display device 113 is adapted to display various kinds of displays about telephone communications on a display screen 114 of the display device 113. The electronic apparatus 100 includes a control portion (not shown) for controlling an operation of the display device 113. The control portion is provided either as a part of a control section for taking charge of control for the entire electronic apparatus 110 or separately from the control section inside either the main body portion 111 or the display portion 112.

The display device 113 has the same structure and configuration as those of the display device 1 according to the first embodiment of the present disclosure. As a result, since it is possible to narrow the frame of the display device 1, it is possible to widen the image display surface or it is possible to miniaturize the electronic apparatus 100 all the more because the frame of the display device 1 is narrowed.

Although the display device 1 of the first embodiment is applied as the example of application to the electronic apparatus, alternatively, the display device according to any of the first and second modified examples of the first embodiment can also be applied as another example of application to the electronic apparatus.

In addition, for example, the present disclosure can also adopt the following constitutions.

(1) A touch panel including: a sensor substrate and a cover substrate stuck to each other, in which the sensor substrate includes a sensor electrode, and plural signal wirings electrically connected to the sensor electrode and extending along a periphery of the sensor electrode; and the cover substrate includes one or plural conductive layers extending along the periphery of the sensor electrode and the plural signal wirings within an area not facing the sensor electrode and the plural signal wirings.

(2) The touch panel described in the paragraph (1), in which each of the one or plural conductive layers has a thicker width than that of each of the plural signal wirings.

(3) The touch panel described in the paragraph (1) or (2), in which each of the one or plural conductive layers is made of a metallic material.

(4) The touch panel described in any one of the paragraphs (1) to (3), further including a flexible printed wiring board connected to the sensor substrate, and having a wiring layer electrically connected to the plural signal wirings, and a fixed electric potential layer electrically connected to the one or plural conductive layers.

(5) The touch panel described in the paragraph (1) or (2), in which each of the one or plural conductive layers is made of a material having a conductive property, elasticity, and viscosity.

(6) A display device, including: an image generating device configured to generate an image; a touch panel disposed on a surface of the image generating device; and a controller configured to control the image generating device and the touch panel, wherein the touch panel includes a sensor substrate and a cover substrate stuck to each other, the sensor substrate including a sensor electrode, and plural signal wirings electrically connected to the sensor electrode and extending along a periphery of the sensor electrode, the cover substrate including one or plural conductive layers extending along the periphery of the sensor electrode and the plural signal wirings within an area not facing the sensor electrode and the plural signal wirings.

(7) An electronic apparatus, including: a display device including an image generating device configured to generate an image, a touch panel disposed on a surface of the image generating device, and a controller configured to control the image generating device and the touch panel, wherein the touch panel includes a sensor substrate and a cover substrate stuck to each other, the sensor substrate including a sensor electrode, and plural signal wirings electrically connected to the sensor electrode and extending along a periphery of the sensor electrode, the cover substrate including one or plural conductive layers extending along the periphery of the sensor electrode and the plural signal wirings within an area not facing the sensor electrode and the plural signal wirings.

It should be understood by those skilled in the art that various modifications, combinations, sub-combinations and alterations may occur depending on design requirements and other factors insofar as they are within the scope of the appended claims or the equivalents thereof.

What is claimed is:

1. A touch panel, comprising:
a plurality of sensor electrodes disposed in a sensor area;
a plurality of signal wires electrically connected to the sensor electrodes and extending along a periphery of the sensor electrodes;
a conductive layer disposed in a peripheral area that is outside the sensor area; and
a light blocking layer that is disposed on an opposite side of the conductive layer from the sensor electrodes and that overlaps the conductive layer and the signal wires in a plan view,
wherein
the conductive layer is disposed outside the signal wires in the plan view in the peripheral area,
the conductive layer is applied with a reference voltage supplied directly from outside of a cover glass, and
the sensor electrodes are disposed in a layer different from the conductive layer.

2. The touch panel according to claim 1, wherein the conductive layer has a thicker width than that of each of the signal wires.

3. The touch panel according to claim 1, wherein the conductive layer is made of a metallic material.

4. The touch panel according to claim 3, further comprising:
a flexible printed wiring board having a wiring layer electrically connected to the signal wires, and
a fixed electric potential layer that is supplied with the reference voltage and electrically connected to the conductive layer.

5. The touch panel according to claim 1, wherein the conductive layer is made of a material having a conductive property, elasticity, and viscosity.

6. The touch panel according to claim 1, wherein
a fixing layer is used when the touch panel is coupled to either a chassis or an image generating device of a display device, and
the fixing layer is disposed along the periphery of the sensor electrodes and the signal wires.

7. The touch panel according to claim 1, further comprising a first insulating layer and a second insulating layer, wherein
the conductive layer is disposed between the first insulating layer and the light blocking layer, and
the first insulating layer that covers the conductive layer is different from the second insulating layer that covers the signal wires.

8. The touch panel according to claim 1, wherein the conductive layer is coupled with the signal wires.

9. A touch panel, comprising:
a plurality of sensor electrodes disposed in a sensor area;
a plurality of signal wires electrically connected to the sensor electrodes and extending along a periphery of the sensor electrodes;
a conductive layer disposed in a peripheral area that is outside the sensor area; and
a light blocking layer that is disposed on an opposite side of the conductive layer from the sensor electrodes and that overlaps the conductive layer and the signal wires in a plan view,
wherein
the conductive layer is disposed outside the signal wires in the plan view in the peripheral area,
the conductive layer is applied with a reference voltage supplied directly from outside of a cover glass,
the light blocking layer faces the signal wires, the conductive layer and a fixing layer, and
the conductive layer is disposed between the light blocking layer and the fixing layer.

10. A touch panel, comprising:
a plurality of sensor electrodes disposed in a sensor area;
a plurality of signal wires electrically connected to the sensor electrodes and extending along a periphery of the sensor electrodes;
a conductive layer disposed in a peripheral area that is outside the sensor area;
a light blocking layer that is disposed on an opposite side of the conductive layer from the sensor electrodes and that overlaps the conductive layer and the signal wires in a plan view; and
a fixing layer that encapsulates the conductive layer with the light blocking layer,
wherein
the conductive layer is disposed outside the signal wires in the plan view in the peripheral area, and
the conductive layer is applied with a reference voltage supplied directly from outside of a cover glass.

* * * * *